United States Patent
Erickson

(10) Patent No.: US 6,739,119 B2
(45) Date of Patent: May 25, 2004

(54) COMBUSTION ENGINE IMPROVEMENT

(75) Inventor: Donald C. Erickson, 1704 S. Harbor La., Annapolis, MD (US) 21401

(73) Assignee: Donald C. Erickson, Annapolis, MD (US)

( * ) Notice: Subject to any disclaimer, the term of this patent is extended or adjusted under 35 U.S.C. 154(b) by 28 days.

(21) Appl. No.: 10/041,819

(22) Filed: Dec. 31, 2001

(65) Prior Publication Data

US 2003/0121268 A1 Jul. 3, 2003

(51) Int. Cl.[7] .............................................. F02C 7/143
(52) U.S. Cl. ..................... 60/39.53; 60/728; 62/238.3
(58) Field of Search ........................... 60/39.511, 39.53, 60/728; 62/238.3

(56) References Cited

U.S. PATENT DOCUMENTS

| | | | | |
|---|---|---|---|---|
| 4,380,909 A | * | 4/1983 | Sung ........................ | 62/238.3 |
| 4,942,734 A | * | 7/1990 | Markbreiter et al. ........ | 62/238.3 |
| 5,203,161 A | * | 4/1993 | Lehto ........................ | 60/39.53 |
| 5,655,373 A | * | 8/1997 | Yamashita et al. ............ | 60/728 |
| 5,669,217 A | * | 9/1997 | Anderson .................. | 60/39.53 |
| 5,790,972 A | * | 8/1998 | Kohlenberger ............. | 60/39.53 |
| 6,247,302 B1 | * | 6/2001 | Tsukamoto et al. ...... | 60/39.511 |
| 6,412,291 B1 | * | 7/2002 | Erickson ..................... | 60/728 |
| 6,457,315 B1 | * | 10/2002 | Lee et al. ..................... | 60/728 |

* cited by examiner

Primary Examiner—Michael Koczo

(57) ABSTRACT

An improvement to an energy conversion engine in which fuel is combusted with compressed air is disclosed. Referring to FIG. 3, the inlet air to compressor (30) is chilled in chiller (34) sufficiently to condense moisture. The moisture is pressurized and routed to at least one of chilled inlet fogger (312) and compressed air sprayer (314). Engine exhaust heats an absorption refrigeration unit once-through generator (316), which supplies the refrigeration to chiller (34).

9 Claims, 3 Drawing Sheets

COMBUSTION ENGINE IMPROVEMENT

CROSS-REFERENCE TO RELATED APPLICATIONS

Not applicable.

STATEMENT REGARDING THE FEDERALLY SPONSORED RESEARCH OR DEVELOPMENT

Not applicable.

REFERENCE TO A MICROFICHE APPENDIX

Not applicable.

BACKGROUND OF THE INVENTION

Combustion engines which compress the combustion air have an ambient temperature sensitivity—both the capacity and the efficiency decrease as the ambient temperature increases. The power demand of the compressor section of the engine is approximately proportional to the absolute temperature of the inlet air, which makes the efficiency of the engine proportional to the inverse of the absolute temperature. The compressor capacity, and hence overall engine capacity, is proportional to the density of the inlet air.

The net result is that for a compressed air combustion engine, both the power output and engine efficiency are de-rated at warm ambients. The degradation is not so severe with reciprocating engines, which require little more than stoichiometric air. The degradation is very severe with combustion turbines, which require on the order of 3 or 4 times stoichiometric air.

One known method of counteracting the warm ambient degradation of compressed air combustion engines is by cooling the inlet air, either evaporatively or with a refrigerant. The refrigerated cooling can be done either in refrigerated air coils or by direct contact with sprayed chilled water. The refrigeration is supplied by either mechanical or absorption refrigeration systems, and in some instances through a cold storage medium (ice or chilled water).

Another approach to cooling combustion engine inlet air is by over-spraying, typically via fogging. Sufficient water is injected into the air in fine droplet form such that it not only reduces the temperature adiabatically to the dew point, but additional droplets remain un-evaporated, and carry into the engine compressor. Those droplets rapidly evaporate as compression proceeds, slowing the temperature increase caused by compression, and hence effectively adding to the amount of inlet cooling. For the droplets to remain suspended in the air into the compressor rather than separate out excessively, they should be in the fog-size range, i.e., less than 40 microns in diameter and preferably 5 to 20 microns. Another advantage of this size range is that the droplets are small enough that they do not erode the compressor blades.

The problems with the current approaches to cooling engine compressor inlet air include the following. Most compressors would benefit thermodynamically from sub-freezing inlet temperatures, or at least could be designed to benefit from those temperatures. However, there are many practical difficulties. Especially with high rotational speed combustion turbines, there is a possibility of ice buildup on inlet guide vanes, which then could spall off and damage the compressor blades. This imposes a practical limiting temperature of about 4° C. for many inlet cooling systems. Cooling below that temperature will require some additional technique of reducing the humidity level of the cold air below saturation—reheat, etc. On the refrigeration side, special measures are also required to deal with the $H_2O$ removal from the air in sub-freezing conditions: periodic defrosting of the air coils, or continuous addition of a melting agent. Furthermore, the refrigeration system requires proportionately more input power to reach the lower temperatures—more shaft power for mechanical refrigeration, or higher quality heat for absorption refrigeration. With mechanical refrigeration, the power necessary to reach sub-freezing temperatures is so large, and the marginal improvement in the engine due to colder compression is so small, that there is little or no net gain from cooling to sub-freezing temperatures.

Even when the inlet cooling is restricted to above-freezing temperatures, other major problems remain. The compressor benefit is substantially due to the sensible cooling of the inlet air, with almost no added benefit from the latent cooling, i.e., the amount of moisture condensed out of the air. However, the latent cooling typically represents 25 to 50% of the total refrigeration load. For example, consider 35° C. air at 50% relative humidity, which is cooled to 5° C. at 100% relative humidity. The moisture content decreases from 1.8 weight percent to 0.55 weight percent. For these conditions, only 51% of the total refrigeration provides sensible cooling, and 49% causes the water condensation. Thus, much of the refrigeration is effectively wasted.

Another problem is that the water removal results in reduced mass flow through the turbine, proportionately reducing its power output. Air flow can be correspondingly increased, but that adds compression power.

The overspray or fogging approach to inlet cooling also presents problems. The two foremost are that the cooling is adiabatic, as opposed to the diabatic cooling of the refrigeration approach; and that a source of pure water is required for every bit of cooling accomplished. The adiabatic limitation causes the inlet sensible temperature to be no lower than the dew point. The cost and availability of pure water mitigate against this approach at many sites.

It is known that injection of some water, as either vapor or liquid, into the compressed air of a combustion turbine increases the capacity and decreases the emissions and heat rate. However, a costly supply of pure water is required.

What is needed, and included among the objects of this invention, are apparatus and process which overcome the prior art problems cited above, i.e., an inlet cooling system wherein the latent load contributes to power augmentation and heat rate improvement in addition to the sensible load contribution; where the benefits of the water injection are available without the limitations of needing a large source of pure water and that the inlet temperature is limited to the dew point; where the thermodynamic benefits of sub-freezing inlet temperatures are achievable without the practical problems; and wherein the refrigeration system is activated by low temperature waste heat so as not to detract from the compressor shaft power reduction (system power gain) provided by the inlet cooling system.

The Nagib '71 article shows that recuperated combustion turbines derive the maximum benefit from inlet cooling. Recuperation causes lower exhaust temperatures, and inlet cooling causes a further reduction in exhaust temperature. Similarly, cogeneration and combined cycle configurations have very low exhaust temperatures. Prior art waste heat-activated absorption inlet cooling cycles require exhaust temperatures of about 200° C. or higher. For the more aggressive spray cooling disclosed here, such temperatures will not usually be available. Thus, one important aspect of this disclosure is the identification of an absorption cycle which can be powered by waste heat well below 200° C.

In order to condense moisture out of the exhaust, it must be cooled to well below 80° C. It would be advantageous if the absorption cycle heat input caused that low a temperature, to minimize any need for additional ambient cooling of the exhaust.

BRIEF SUMMARY OF THE INVENTION

This disclosure recites a compressed air combustion engine with inlet cooling supplied by an absorption unit powered by the combustion exhaust. Moisture is condensed from the inlet air and/or from the exhaust, and is sprayed into the compressed air and/or fogged into the chilled inlet air. The special flow sequence desirable in a two-pressure absorption cycle in this service is disclosed, as well as the three-pressure absorption cycle which provides maximum thermodynamic benefit.

In particular, an apparatus for energy conversion is disclosed comprised of:
 a) a combustion engine comprised of a compressor, a combustor, and a work expander;
 b) an engine inlet air chiller;
 c) an absorption refrigeration unit which supplies chilling medium to said chiller;
 d) an exhaust heat exchanger which transfers heat to said ARU from said engine exhaust;
 e) a means for collecting condensate from at least one of said chiller and said exhaust heat exchanger; and
 f) a means of injecting at least part of said collected condensate into said compressor discharge vapor.

In another embodiment, the energy conversion apparatus is comprised of:
 a) a combustion engine with a combustion air compressor;
 b) an absorption refrigeration unit (ARU) which is powered by engine exhaust;
 c) a sequential path for absorbing solution in said ARU comprised of the following components in sequence:
  i) a solution pump;
  ii) a solution cooled vapor rectifier (SCVR);
  iii) a solution heat exchanger (SHX);
  iv) an exhaust heated once-through co-current vapor generator; and
  v) a vapor liquid separator which sends vapor to said SCVR and liquid to said SHX.

DETAILED DESCRIPTION OF THE INVENTION

Figure 1:
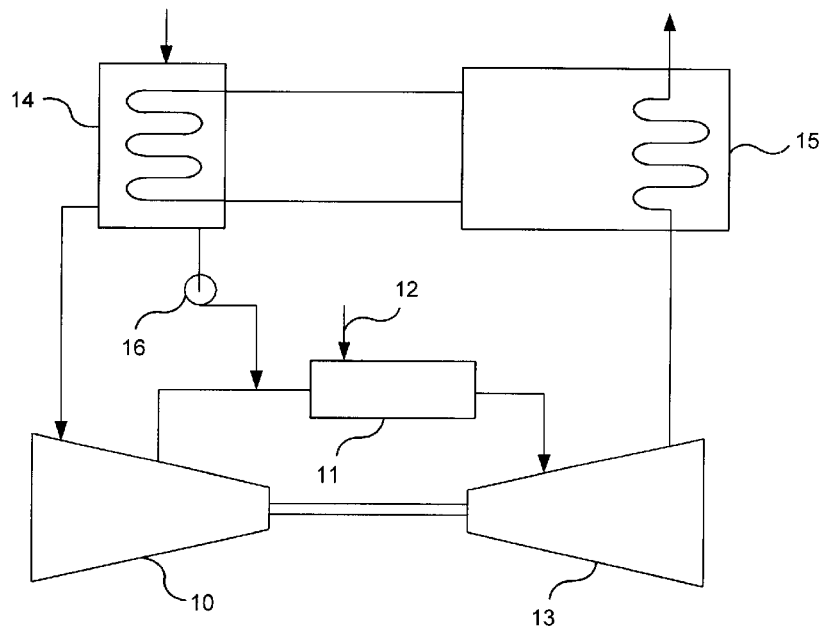
FIG. 1 illustrates one combination of essential features of this invention, wherein spray injecting moisture is collected by chilling the inlet air with the exhaust heat-powered absorption refrigeration unit (ARU) refrigeration.

Referring to FIG. 1, a combustion engine which converts fuel energy to mechanical energy is comprised of compressor 10, combustor 11, fuel supply 12, and work expander 13 (e.g., a turbine). Inlet air to the compressor is chilled in chiller 14, which is supplied chilling medium (e.g., refrigerant) from absorption refrigeration unit (ARU) 15, which is heated by exhaust gas from expander 13. Moisture condensed from the air is collected and pressurized by pump 16, then spray injected into the compressed air from compressor 10, prior to undergoing combustion in combustor 11.

Figure 2:
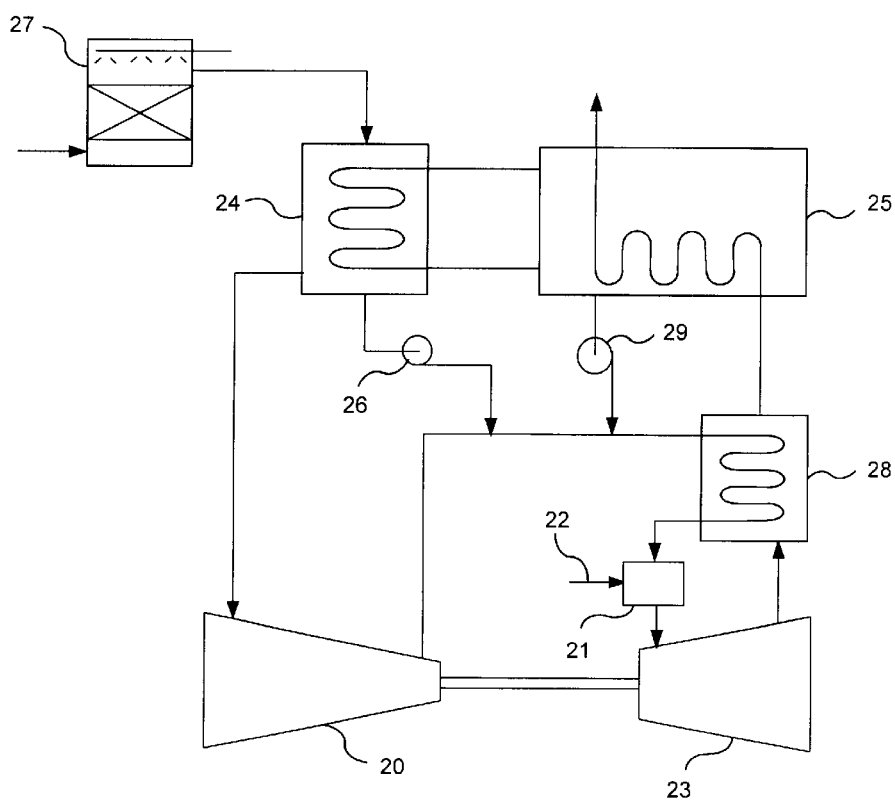
FIG. 2 is a second embodiment, wherein the inlet air is humidified before chilling, so as to increase the yield of de-mineralized moisture collected; and spray injection moisture is also collected from the exhaust.

FIG. 2 illustrates several desirable added features beyond those disclosed in FIG. 1. Components 20–26 have similar descriptions as corresponding 10–16 of FIG. 1. Humidifier 27 (e.g., an evaporative cooler) adiabatically humidifies the inlet air before it is chilled—this increases the moisture loading, and hence the amount of de-mineralized water which can be collected for re-injection. Recuperator 28 increases the energy efficiency of the overall cycle. Pump 29 pressurizes the moisture condensed from the exhaust for injection into the compressed air.

Figure 3:
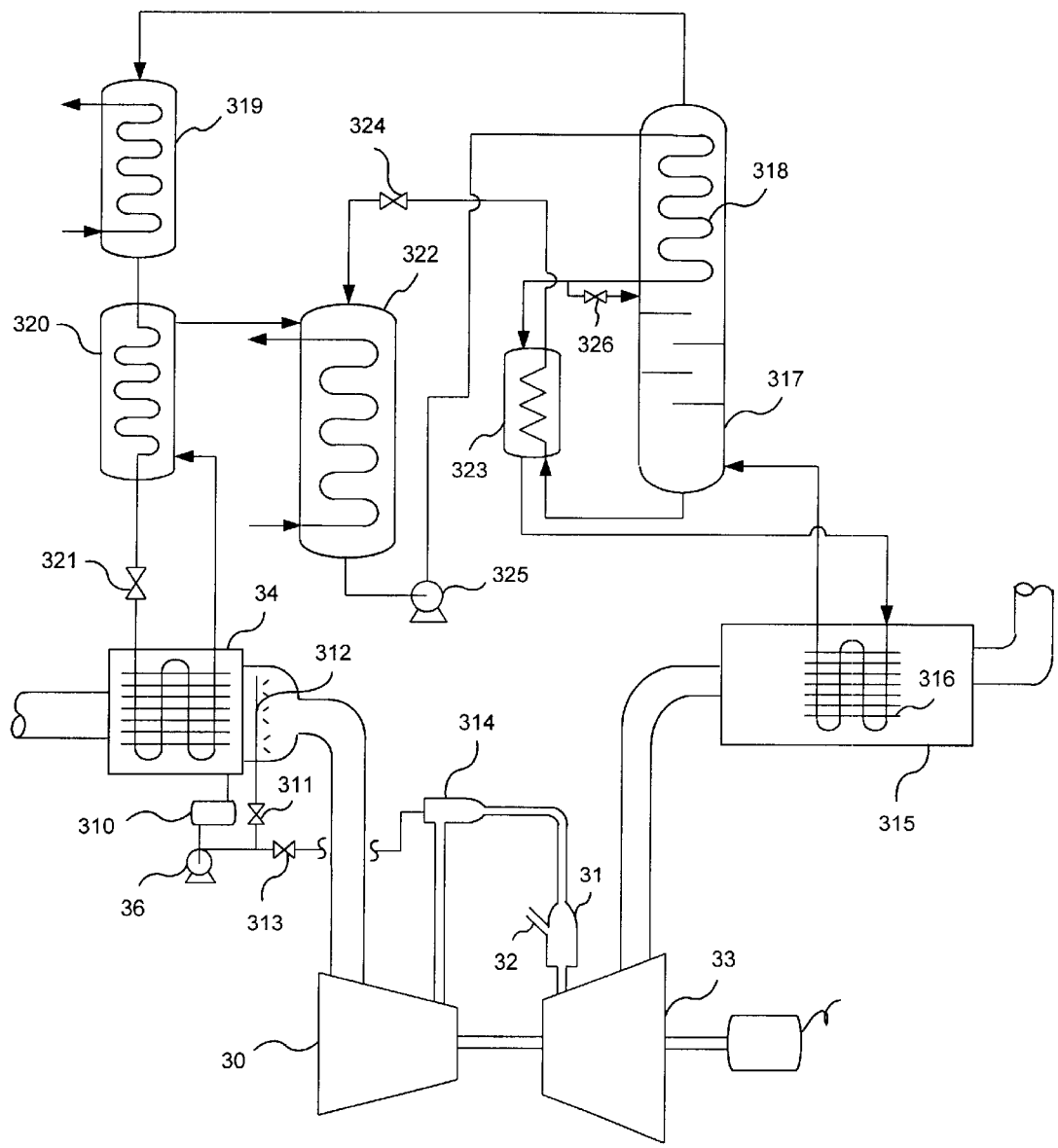
FIG. 3 discloses that the moisture collected from the inlet air can be routed to either or both of two locations as the need arises: into the chilled inlet air as fog; or into the compressed air. It also discloses details of the two-pressure ARU configuration which allows use of low temperature exhaust heat.

FIG. 3 provides preferred elaboration of FIG. 1, with additional features. Inlet air to combustion engine compressor 30 is chilled in inlet chiller 34. Condensed moisture is collected in receiver 310 and pressurized by pump 36. It can then be routed through valve 311 to fogging apparatus 312, and/or through valve 313 to spray apparatus 314 located in the discharge line from compressor 30. After being combusted with fuel 32 in combustor 31, the hot combustion gas is work expanded in expander 33, and the hot exhaust is routed through heat recovery vapor generator 315, which contains at a minimum a once-through co-current mass exchange high-pressure solution vapor generator 316. "Once through" signifies that the fluid makes a single pass through this component 316 each time it enters, as illustrated. Conventional heat recovery steam generators are of the recirculating type, with a steam drum, wherein the liquid passes multiple times through the boiling coils each time it enters the generator.

The waste heat-powered two-pressure ARU depicted in FIG. 3 is comprised of high-pressure generator 316 which supplies two-phase solution to high-pressure separator/rectifier 317. The separated vapor is rectified adiabatically, and also diabatically at solution-cooled rectifier 318, and then condensed in condenser 319. The liquid condensate is sub-cooled in refrigerant heat exchanger 320, and then reduced in pressure at expansion valve 321, and supplied to chiller coils 34, where it evaporates. The cold vapor is warmed in refrigeration heat exchanger 320, then absorbed in the low-pressure absorber 322. The liquid separated in separator 317 is cooled in solution heat exchanger 323, reduced in pressure by means for pressure reduction 324, and then absorbs the vapor in low-pressure absorber 322. Solution pump 325 pressurizes the low-pressure absorbent solution back to high pressure, which is then routed through solution-cooled rectifier 318, solution heat exchanger 323, and once-through high-pressure generator 316, thence to separator 317 to complete the cycle. The rectification in rectifier 317 proceeds more efficiently, and hence the entire ARU, when a minor fraction of the solution is refluxed directly into the rectifier through bypass 326.

Injecting a given amount of moisture as fog in the chilled inlet air provides a greater increase in power, whereas spraying the same amount into the compressed air provides a greater increase in efficiency (decrease in heat rate—for recuperated cycle). Hence, this flowsheet allows either or both to be done, as needs dictate. In any event, the fogging and/or spraying should be varied slowly so as to not thermally shock or otherwise damage the apparatus from differential thermal expansion.

The maximum safe moisture loading possible with fogging is much lower than that possible by spraying into the compressed air. Typically about 1% by weight of the inlet air or less is obtainable by condensation from the inlet air, and that is approximately the amount which can safely be fogged into saturated air. On the other hand, much larger amounts can be sprayed into the compressed air, e.g., up to 7 or 8%. The collected moisture can be supplemented by a separate source of de-mineralized water. A preferred approach when water is scarce or costly is to extract significant moisture from the exhaust gas. That is what is illustrated in FIG. 4.

Figure 4:
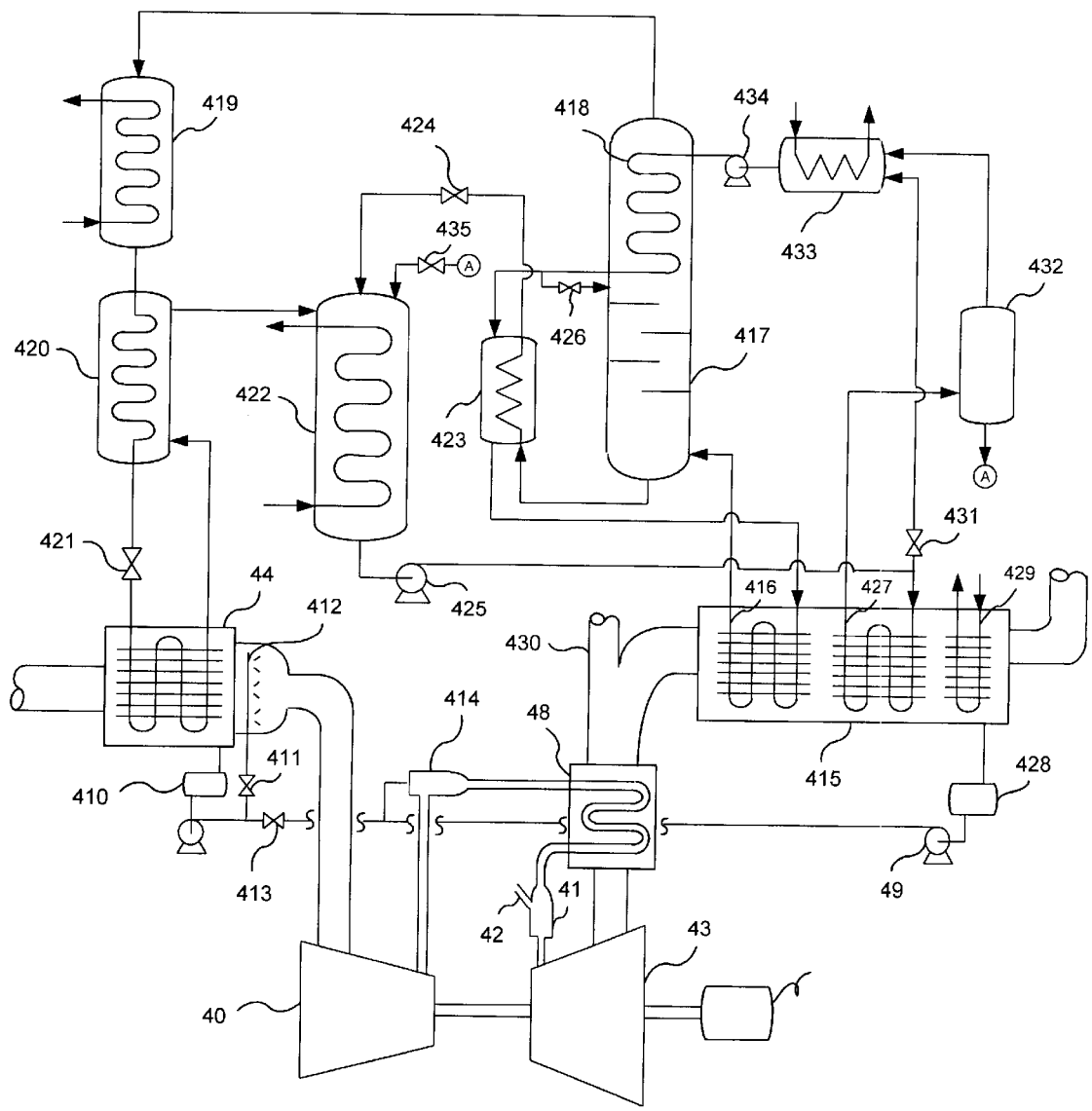
FIG. 4 illustrates a recuperated combustion engine adapted for spray injection moisture collection at two locations, and also a three-pressure ARU which permits exceptionally low exhaust temperatures to be used.

In FIG. 4, the components 40–426 have descriptions similar to the correspondingly numbered components in FIGS. 2 and 3. In order to cool the exhaust sufficiently to condense out moisture to be collected at receiver 428, a lower temperature coil 427 is provided which is a once-through intermediate pressure solution vapor generator (IP generator). Some additional ambient cooling may also be necessary at coil 429. Also, a damper-controlled bypass 430 will assist in maximizing the cooling of the non-bypassed exhaust into the condensation range.

Solution from low-pressure solution pump is split by splitter 431, with part routed through IP generator 427 into IP vapor-liquid separator 432, and the remainder to IP absorber 433, where it absorbs the vapor from IP separator 432. The resulting absorbent solution is pressurized to high pressure by high-pressure (HP) solution pump 434, and routed to solution-cooled rectifier 418. The liquid from separator 432 is let down in pressure at expansion valve 435, and routed to LP absorber 422.

The third (intermediate) pressure level allows generator 427 to operate at a lower temperature level. This has two beneficial effects. The amount of heat necessary at HP generator 416 is decreased, and hence it can use a lower temperature inlet exhaust heat, on the order of 150° C. Secondly, IP generator 427 cools the exhaust to lower temperatures, e.g., on the order of 75° C., already below the dewpoint. This facilitates moisture condensation.

Any known type of ARU may be used, e.g., LiBr—H$_2$O or NH$_3$—H$_2$O. The latter is preferred because it more readily adapts to the directly integrated configurations of FIGS. 3 and 4, i.e., refrigerant supplied directly to the chiller and solution supplied directly to the heat recovery vapor generator (HRVG). This reduces cost and allows use of lower exhaust temperatures.

The minimum required exhaust temperature can be further reduced in those flowsheets having an IP absorber by adding a second coil at the entrance of the inlet chiller, cooled by an IP evaporator. The IP vapor is then absorbed in the IP absorber.

For NH$_3$—H$_2$O ARUs, the low pressure is in the approximate range of 3 to 6 bar, high pressure (caused by ambient cooling temperature) of 8 to 20 bar, and IP 1 to 4 bar above low pressure.

This moisture spray can be after only partial compression (inter-stage spray) as well as after final compression.

The combustion engine can be a reciprocating type in lieu of the illustrated turbine type.

Other exhaust heat recovery apparatus may be present, e.g., cogeneration of steam, in the hotter section of the HRVG.

Some of the cooled inlet air and/or spray cooling may be applied to electrical circuit cooling as needed.

What is claimed is:
1. An apparatus for energy conversion comprised of:
   a) a combustion engine comprised of a compressor, a combustor, and a work expander;
   b) an engine inlet air chiller;
   c) an absorption refrigeration unit which supplies chilling medium to said chiller;
   d) an exhaust heat exchanger which transfers heat to said ARU from said engine exhaust;
   e) a means for collecting condensed water from said chiller;
   f) a means for spraying at least part of said water into said compressor discharge vapor; wherein said ARU comprises the following components in flow sequence:
      i. solution pump;
      ii. solution-cooled vapor rectifier;
      iii. solution heat exchanger;
      iv. once-through vapor generator; and
      v. vapor-liquid separator.
2. An apparatus for energy conversion comprised of:
   a). a combustion engine with a combustion air compressor;
   b). an absorption refrigeration unit (ARU) which is powered by engine exhaust;
   c). a sequential path for absorbing solution in said ARU comprised of the following components in sequence:
      i). a solution pump;
      ii). a solution cooled vapor rectifier (SCVR);
      iii). a solution heat exchanger (SHX);
      iv). an exhaust heated once-through co-current vapor generator; and
      v). a vapor liquid separator which sends vapor to said SCVR and liquid to said SHX.
3. The apparatus according to claim 2 additionally comprised of an inlet chiller for the engine air which is supplied chilling agent from said ARU.
4. The apparatus according to claim 3 additionally comprised of a means for injecting moisture collected from said chiller into at least one of the chilled engine inlet air and the engine compressed air.
5. The apparatus according to claim 4 additionally comprised of a recuperator for said combustion engine, and wherein said injection into said compressed air is before said recuperator.
6. The apparatus according to claim 2 additionally comprised of an adiabatic humidifier for said inlet air.
7. The apparatus according to claim 3 additionally comprised of an adiabatic humidifier for said inlet air upstream of said chiller.
8. The apparatus according to claim 5 additionally comprised of an adiabatic humidifier for said inlet air upstream of said chiller.
9. An apparatus for energy conversion comprised of:
   a) a combustion engine comprised of a compressor, a combustor, and a work expander;
   b) an engine inlet air chiller;
   c) an absorption refrigeration unit which supplies chilling medium to said chiller;
   d) an exhaust heat exchanger which transfers heat to said ARU from said engine exhaust;
   e) a means for collecting condensed water from said chiller;
   f) a means for fogging at least part of said condensate into said chilled inlet air; and
   g) a means for spraying any remaining condensate into said compressed air.

* * * * *